No. 680,535. Patented Aug. 13, 1901.
J. B. MERIAM.
APPARATUS FOR CHARGING STORAGE BATTERIES OF AUTOMOBILE VEHICLES.
(Application filed Oct. 11, 1900.)
(No Model.)
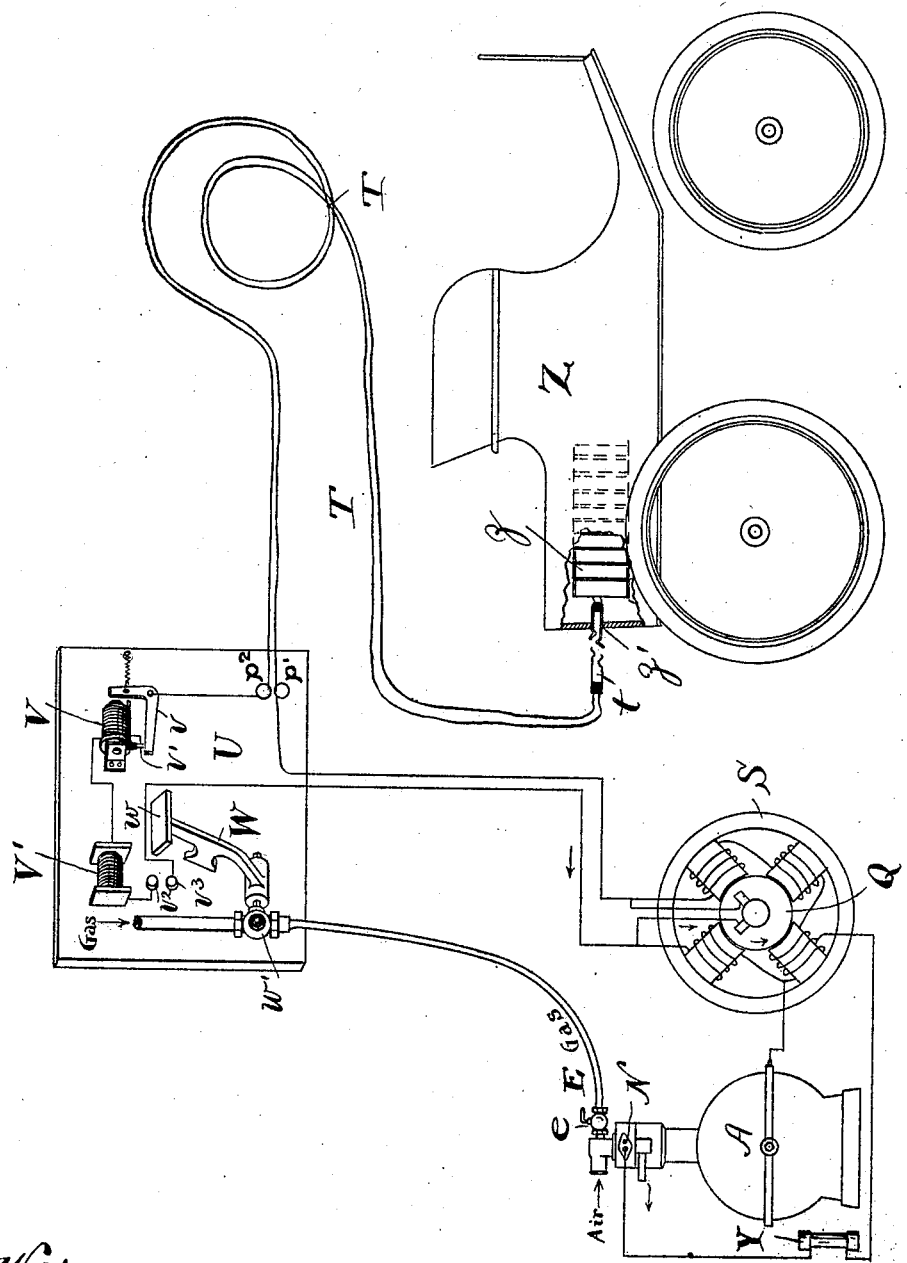
Witnesses
E. B. Gilchrist
F. D. Ammen
Inventor,
Joseph B. Meriam,
By Thurston & Bates,
Attorneys,

UNITED STATES PATENT OFFICE.

JOSEPH B. MERIAM, OF CLEVELAND, OHIO.

APPARATUS FOR CHARGING STORAGE BATTERIES OF AUTOMOBILE VEHICLES.

SPECIFICATION forming part of Letters Patent No. 680,535, dated August 13, 1901.

Application filed October 11, 1900. Serial No. 32,741. (No model.)

*To all whom it may concern:*

Be it known that I, JOSEPH B. MERIAM, a citizen of the United States, residing at Cleveland, in the county of Cuyahoga and State of Ohio, have invented a certain new and useful Improvement in Apparatus for Charging Storage Batteries of Automobile Vehicles, of which the following is a full, clear, and exact description, reference being had to the accompanying drawing.

The object of this invention is to provide in a very simple and cheap form a unit or self-contained plant for the automatic charging of the storage batteries of automobile vehicles, as horseless carriages, electric launches, &c. In accomplishing this object I have provided an explosive-engine and a dynamo connected therewith and electric terminals connected to the dynamo and so arranged as to be separably connected to the storage battery in the vehicle, so that the residual current in the battery may operate the dynamo as a motor to speed up the engine to the proper degree to compress the explosive mixture, whereupon the engine operates to continue the rotation of the armature to charge the battery. My invention comprehends such combination and operation.

I ignite the explosive mixture by an electric spark the current for which is taken directly from the field-coils of the dynamo by a shunt (normally open) around a portion thereof. This is also comprehended within my invention. I provide an electric-circuit breaker for automatically opening the circuit and at the same time cutting off the fuel-supply when the battery is sufficiently charged. All these various features coöperating together enable the charging plant to be connected and left without attendance, which is an important feature, as it enables the vehicle to be simply connected and then recharged without taking the operator's time.

The drawing is in the nature of a diagram, but clearly illustrates my invention. The engine and dynamo are for clearness illustrated separately; but it is to be understood that the engine is connected with the dynamo, so as to drive it.

A represents the engine, S the dynamo-field, and Q the armature. This dynamo is shunt-wound, and its two main lines lead preferably to a switchboard, where the cut-out mechanism is located. As shown, a pair of lines T lead from the plug $t$ to the binding-posts $P'$ $P^2$ of the switchboard. From thence one line of the dynamo-circuit passes directly from the switchboard binding-post $P'$ to the dynamo and the other from the post $P^2$ through a bell-crank armature $v$ of a pilot-magnet V, and thence to a contact-point $v'$, through the winding of said pilot-magnet and through the winding of a throw-out magnet $V'$, to a contact-point $v^2$, and from a separated contact-point $v^3$ the line continues to the dynamo.

W represents the circuit-breaker lever, which is adapted to engage the two points $v^2$ and $v^3$, connecting them together, and carries an armature-plate $w$, which is adapted to coöperate with the pole-pieces of the magnet $V'$, which when energized holds the lever in this bridging position.

Where gas under pressure is employed to operate the engine, the lever W is journaled on or connected with a cock $w'$ in the gas-pipe, so that when the lever connects the points $v^2$ $v^3$ the gas is turned on; but when the lever drops back into the position shown in the figure, which it tends to do by gravity, the gas is turned off at this cock $w'$.

E represents the gas-pipe to the engine, and $e$ an additional hand gas-cock.

In my apparatus the simple opening of the circuit to the storage battery prevents ignition, which of course in itself stops the engine, and no shutting off of the fuel is necessary when the suction of the engine draws in the gas or vapor not under feeding pressure, though in this latter case it is desirable to have a cock corresponding to the cock $w'$ operated by the circuit-breaker. This operation will appear from the following: The field of the motor is shunt-wound, as illustrated, so that any current coming over the lines T will immediately energize the fields and cause the rotation of the armature. The sparking-circuit of the engine runs from the frame of the engine (to which one electrode is electrically connected) to a field-coil, around such portion of the field-coil as desired, and then from another point of the field through the spark-coil Y to the other electrode. Thus a shunt is formed around a portion of the field-coil. This shunt is normally open, and even when closed (as it is just preceding the sparking operation by mechanism for contacting and separating the electrodes) it does not materially affect the operation of the dynamo, simply providing another path for a small portion of the field. This makes the ignition dependent upon the operation of the dynamo.

The operation of my plant is as follows: When it is desired to recharge the automobile Z, the plug $t$ is inserted in the other member $z'$ of the jack on the automobile and the circuit-breaker lever W shoved upward until it bridges the points $v^2 v^3$, whereupon the magnet V' holds it in this position and the armature begins to revolve, driving the piston idly by the residual current in the battery $z$. When the proper speed is thus obtained to sufficiently compress the explosive mixture, the force of the latter automatically continues the rotation, thus driving the dynamo as a generator and charging the batteries. The charging continues without attendance by the operator until the battery is fully charged. As this point is reached the current becomes strong enough to energize the pilot-magnet V sufficiently to draw its armature $v$ to it. This breaks the circuit at the point $v'$, deënergizing the magnet V', which lets the circuit-breaker lever drop. This opens the circuit, and may also shut off the fuel, as at the cock $w'$, and the engine ceases to drive. It will thus be seen that the residual force in the battery is used to speed the engine up to the proper amount to compress the explosive mixture and that the winding and connections are such that as soon as this point is reached the engine may become a prime mover, charging the battery, and may be left to take care of itself automatically.

I claim—

1. The combination of an explosive-engine, a dynamo connected therewith so as to drive the engine or be driven by it, an automobile vehicle containing a storage battery, and electric connections leading from the dynamo to terminals separably connected to the storage battery, whereby the simple connection of said terminals allows the residual current in the battery to speed up the engine to the proper amount to start it to drive the dynamo.

2. An automobile vehicle carrying a storage battery and one member of an electric jack connected with said battery and constituting terminals thereof, combined with an automatic charging plant consisting of an explosive engine and a dynamo connected therewith and electric connections leading from the dynamo to the other member of said electric jack, said two members of the jack being separable, said arrangement operating when the two parts of the jack are in engagement to allow the residual current in the battery to operate the dynamo as a motor to speed up the engine to the proper point to allow it to operate the dynamo as a dynamo to recharge the battery.

3. An explosive-engine, a dynamo connected therewith so as to drive the engine or be driven by it, an automobile vehicle containing a storage battery, and electric connections leading from the dynamo to terminals separably connected to the storage battery, whereby the simple connection of said terminals allows the residual current in the battery to speed up the engine to the proper amount to start it to drive the dynamo, combined with an electric-circuit breaker in the circuit from the dynamo adapted to open the circuit when the battery is sufficiently charged.

4. The combination of an explosive-engine, a dynamo connected therewith so as to drive the engine or be driven by it, an automobile vehicle containing a storage battery, and electric connections leading from the dynamo to terminals separably connected to the storage battery, whereby the simple connection of said terminals allows the residual current in the battery to speed up the engine to the proper amount to start it to drive the dynamo, and an automatically-operated device adapted to shut off the fuel-supply when the battery is sufficiently charged.

5. The combination of an explosive-engine, a dynamo connected therewith so as to drive the engine or be driven by it, an automobile vehicle containing a storage battery, and electric connections leading from the dynamo to terminals separably connected to the storage battery, whereby the simple connection of said terminals allows the residual current in the battery to speed up the engine to the proper amount to start it to drive the dynamo, the ignition in said engine being controlled by a sparking device receiving its current by means of a shunt around a portion of the field-winding of said dynamo.

6. In a charging plant, the combination of an explosive-engine, a dynamo connected therewith and adapted to be driven thereby, a sparking device for said engine, and a shunt around a portion of the field of the dynamo for supplying current to said sparking device.

In testimony whereof I hereunto affix my signature in the presence of two witnesses.

JOSEPH B. MERIAM.

Witnesses:
ALBERT H. BATES,
F. D. AMMEN.